United States Patent [19]

Izumo

[11] 4,147,523
[45] Apr. 3, 1979

[54] APPARATUS FOR CONTINUOUSLY TREATING GAS WITH ACTIVATED CARBON

[75] Inventor: Masanori Izumo, Neyagawa, Japan
[73] Assignee: Daikin Kogyo Co., Ltd., Osaka, Japan
[21] Appl. No.: 794,624
[22] Filed: May 6, 1977
[30] Foreign Application Priority Data
 May 8, 1976 [JP] Japan ................................. 51-52578
[51] Int. Cl.$^2$ .......................................... B01D 53/08
[52] U.S. Cl. ........................................ 55/208; 55/269; 55/390
[58] Field of Search ............... 55/79, 208, 269, 390, 55/DIG. 30

[56] References Cited

U.S. PATENT DOCUMENTS

| | | | |
|---|---|---|---|
| 2,419,245 | 4/1947 | Arveson | 252/242 |
| 2,544,214 | 3/1951 | Beag | 55/390 X |
| 2,766,185 | 10/1956 | Pansing | 196/50 |
| 2,851,428 | 9/1958 | Wayne | 242/417 |
| 3,261,145 | 7/1966 | Paulson et al. | 55/208 X |
| 3,960,507 | 6/1976 | Tsudikawa et al. | 55/DIG. 30 |
| 4,047,906 | 9/1977 | Murakami et al. | 55/390 X |

FOREIGN PATENT DOCUMENTS 2107717  8/1972  Fed. Rep. of Germany ............. 55/208

Primary Examiner—John Adee
Attorney, Agent, or Firm—Thomas R. Boland

[57] ABSTRACT

Apparatus for continuously treating a gas containing organic substances with activated carbon while regenerating the spent activated carbon with a regeneration gas, including an adsorption vessel composed of a plurality of vertically spaced contacting chambers in which layers of activated carbon are fluidized by the gas to be treated to effect adsorption of the organic substances; a desorption vessel adapted to receive a moved bed of spent activated carbon produced in the adsorption zone and to regenerate the spent activated carbon with the regeneration gas by application of heat; and means for recycling the regenerated activated carbon from the desorption vessel to the adsorption vessel.

7 Claims, 3 Drawing Figures

APPARATUS FOR CONTINUOUSLY TREATING GAS WITH ACTIVATED CARBON

BACKGROUND OF THE INVENTION

This invention relates to an apparatus for treating a gas containing organic substances, and more particularly, an apparatus for removing the organic substances from the gas by adsorption with activated carbon while regenerating spent activated carbon used in the adsorption stage.

A variety of apparatuses for treatment of gases with activated carbon have been hitherto proposed. Most of the conventional apparatuses are of a batch system, in which a gas to be treated is allowed to pass through a tower filled with activated carbon.

Such a batch system is inefficient and unduly expensive since it utilizes the same amount of activated carbon regardless of whether the gas to be treated contains a large or small amount of organic substances. Thus, in any event, a large amount of spent activated carbon must be regenerated, adding to the costs of the operation.

SUMMARY OF THE INVENTION

It is an object of the invention to provide an apparatus in which treatment of a gas with activated carbon and regeneration of the spent activated carbon are simultaneously and continuously performed.

Another object of the invention is to provide an apparatus in which treatment of gas with activated carbon is conducted with high adsorption efficiency.

It is a special object of the invention to provide an apparatus for continuously recovering organic substances contained in the gas to be treated.

In accomplishing the foregoing objects, the present invention provides an apparatus for treating a gas with activated carbon while regenerating the spent activated carbon with a regeneration gas, which includes (a) an adsorption vessel having an outlet port at the top of the adsorption vessel for the treated gas, a plurality of perforated plates dividing the adsorption vessel into vertically spaced contiguous contacting chambers, said perforated plates each being adapted to support a mass of fluidized activated carbon thereabove while permitting the flow of the gas to be treated therethrough, and each of said contacting chamber being provided with a passage through which activated carbon flows by gravity, an inlet conduit for the gas to be treated in the adsorption vessel below the lowermost perforated plate, and a regenerated activated carbon supply port in the uppermost contacting chamber;

(b) a desorption vessel adapted to receive a moved bed of activated carbon and having a port provided at the top of the desorption vessel and adapted to introduce the spent activated carbon, discharged from said activated carbon passage at the lowermost contacting chamber, into the desorption vessel therefrom, a regeneration gas discharge port at the upper portion of the desorption vessel, a regeneration gas supply port at the lower portion of the desorption vessel, means for heating the activated carbon moving in the desorption vessel, and a regenerated activated carbon discharge port at the bottom of the desorption vessel;

(c) a recycling path extending between said regenerated activated carbon discharge port and said regenerated activated carbon supply port in the adsorption vessel;

(d) means for recycling the regenerated activated carbon from the desorption vessel to the adsorption vessel through said recycling path; and (e) a vertical partition plate in the uppermost contacting chamber in the adsorption vessel dividing the inner space thereof into a first sub-contacting chamber and a second sub-contacting chamber such that said regenerated activated carbon supply port is included in said first sub-contacting chamber while said outlet port for the treated gas and said activated carbon passage provided at the uppermost perforated plate are included in said second sub-contacting chamber, said vertical partition plate being provided with means adapted to allow activated carbon to flow therethrough from said first subcontacting chamber to said second sub-contacting chamber, and said first sub-contacting chamber having a gas outlet conduit extending to said inlet conduit for the gas to be treated.

The activated carbon heating means is preferably a heat exchanger having a plurality of horizontal pipes each carrying a heating medium and having a plurality of fins in order to effect the desorption with high efficiency.

BRIEF DESCRIPTION OF THE DRAWING

The above and other objects, features and advantages of the present invention will become more apparent from the following description, when considered along with the accompanying drawing which shows, for purposes of illustration, preferred embodiments of the present invention.

In the drawing.

DETAILED DESCRIPTION OF THE PREFERRED EMBODIMENTS

Figure 1:
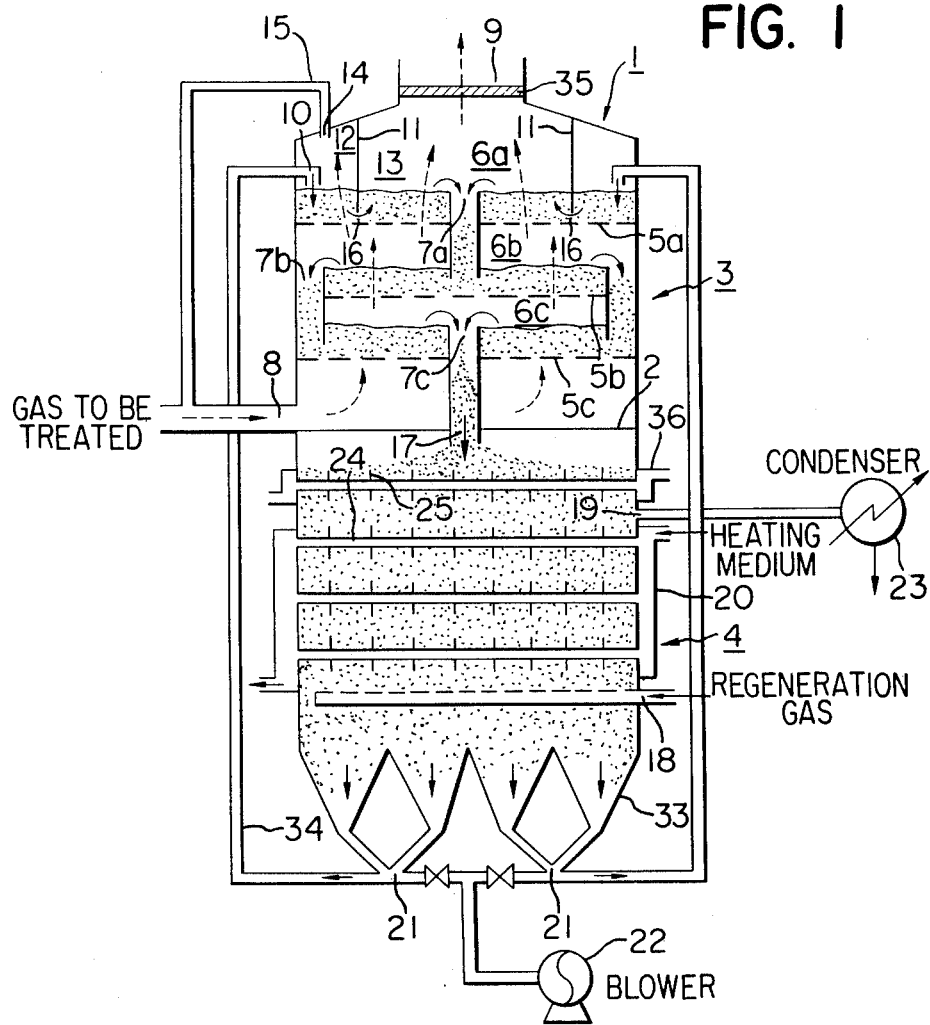
FIG. 1 is a vertical cross-sectional view, schematically showing an apparatus of the present invention.

Referring to FIG. 1, a vertically elongated housing 1 is divided by a partition plate 2 into a cylindrical adsorption vessel 3 and a desorption vessel 4 having a square horizontal cross-section. A gas containing organic substances is treated with activated carbon in the adsorption vessel 3 while the spent activated carbon from the adsorption vessel is regenerated in the desorption vessel 4. The regenerated hot activated carbon is recycled into the adsorption vessel 3. The adsorption vessel 3 is divided by a plurality of perforated plates or grids 5a, 5b and 5c into vertically spaced continguous contacting chambers 6a, 6b and 6c, each of the grids 5 being adapted to support a mass of fluidized bed of activated carbon thereabove and to allow the gas to be treated to flow therethrough. Each of the contacting chambers 6a, 6b and 6c is respectively provided with a passage 7a, 7b and 7c preferably extending between the upper surface of the fluidized bed of one chamber and the middle of the fluidized bed of the succeeding chamber. An inlet conduit 8 for the gas to be treated is provided in the adsorption vessel 3 at a point below the lowermost perforated plate 5c. An outlet port 9 for the treated gas and a regenerated activated carbon supply port 10 are provided in the uppermost contacting chamber 6a.

Thus, the fresh activated carbon is continuously introduced from the supply port 10 into the uppermost contacting chamber 6a where it is brought into contact with the gas to be treated which as introduced from the inlet conduit 8 to form fluidized bed on the grid 5a. The activated carbon is then introduced into the succeeding contacting chamber 6b by overflowing the passage 7a and by flowing therethrough by gravity. The activated carbon is finally discharged from the passage 7c as a spent activated carbon. On the other hand, as shown by the dashed arrows, the gas to be treated flows successively through the contacting chambers 6c, 6b and 6a, where the layers of activated carbon are fluidized so that organic substances contained in the gas are adsorbed in the activated carbon. The gas, after having its organic contaminants removed, is withdrawn from the outlet 9. Accordingly, in the adsorption vessel of the invention, adsorption is effected with high adsorption efficiency because activated carbon is successively brought into contact with a gas having an increased organic content.

The uppermost contacting chamber 6a is divided by a tubular vertical partition plate 11 into a first sub-contacting chamber 12 and a second sub-contacting chamber 13 in such a manner that the regenerated activated carbon supply port 10 is included in the first sub-contacting chamber 12, whereas both the outlet port for the treated gas 9 and a passage 7a are involved in the second sub-contacting chamber 13. The first sub-contacting chamber is provided at the top thereof with a gas outlet 14 which is connected by a conduit 15 to the inlet conduit for the gas to be treated 8. The vertical partition plate 11 has an opening 16 through which the activated carbon in the first sub-contacting chamber is allowed to flow into the second sub-contacting chamber. Thus, the hot activated carbon in the first sub-contacting chamber is brought into contact with the gas for direct heat exchange therewith and thereafter flows through the opening 16 into the second sub-contacting chamber for effecting adsorption. The gas which has been brought into contact with hot activated carbon in the first sub-contacting chamber 12 and which may still contain organic substances is recycled into the adsorption vessel through the conduit 15.

The desorption vessel 4 is adapted to receive a moved bed of activated carbon and to regenerate the spent activated carbon produced in the adsorption vessel 3 with a regeneration gas by application of heat. The desorption vessel includes a spent activated supply port 17 at the top thereof, a regeneration gas inlet port 18 at the lower portion thereof, a regeneration gas outlet port 19 at the upper portion thereof, a heat exchanger 20 above the regeneration gas inlet port 18 and a regenerated activated carbon discharge port 21 at the bottom thereof. The spent activated carbon discharged from the passage 7c of the adsorption vessel is continuously introduced into the desorption vessel and moves downwardly while being heated and brought into contact with the upwardly flowing regeneration gas. The regenerated activated carbon is finally discharged from the discharge port 21 and is recycled to the adsorption vessel by means of a blower 22 through a recycling path 34. The regeneration gas emitted from the gas discharge port 19 may be introduced into a condenser 23 for recovering organic substances contained in the regeneration gas.

Figure 2:
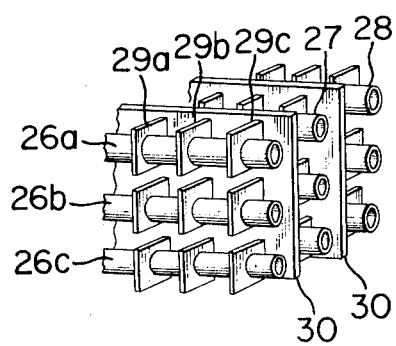
FIG. 2 is an enlarged fragmentary perspective view of pipes of a heat exchanger in the desorption vessel.
Figure 3:
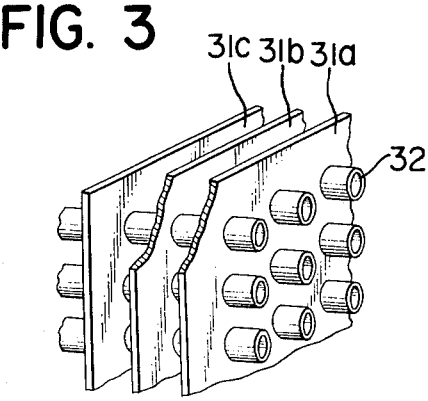
FIG. 3 is an enlarged fragmentary perspective view of pipes of another heat exchanger.

In order to effect the regeneration of the spent activated carbon with high regeneration efficiency, it is preferred that a plurality of vertically elongated contacting zones be defined in the desorption vessel. For this purpose, the heat exchanger 20 of the invention has a plurality of horizontal pipes 24 each carrying a hot fluid therein and having a plurality of fins 25 around the periphery thereof. FIG. 2 shows one of the suitable arrangement of the pipes where pipes are arranged horizontally on one vertical plane and spaced apart substantially at the same distance from one another to form one row of pipes 26a, 26b, 26c, plurality of such rows 26, 27, 28 being laterally arrayed in parallel with each other at the substantially same interval. Each of the pipes has a plurality of fins 29a, 29b, 29c equally spaced from each other in the longitudinal direction. A vertical plate 30 may be preferably interposed between each of the neighbouring rows of pipes. The fins and/or vertical plates 30 may define a plurality of vertically elongated passages for moved bed of activated carbon so that a deflection of the flow of the regeneration gas is minimized. FIG. 3 shows another example of the heat exchanger, wherein a plurality of vertical plates 31a, 31b and 31c serve to function as common fins to each of the pipes 32. Moreover, providing a preheater 36 at a position above the regeneration gas discharge port 19 is advantageous to prevent organic vapors from being condensed at the upper portion of the desorption vessel as well as to increase the desorption efficiency. The preheater 36 may be a heat exchanger of a type similar to the heat exchanger 20.

The regenerated activated carbon is preferably discharged through a plurality of chutes 33, of generally inverted frustopyramidal shape, forming forkedly at the lower end of the desorption vessel. The enlarged end section of each of the chutes has an area of 0.05 to 2 m$^2$, preferably 0.2 to 1 m$^2$. The provision of such chutes may improve desorption efficiency of the desorption vessel since the bed of the activated carbon may flow down uniformly and continuously. The neck of each of the chutes 33 may be connected either jointly (as shown in FIG. 1) or separately to the discharge port 21.

A layer of oxidation catalyst 35 is advantageously provided at the top of the adsorption vessel for treating a gas containing substances which are hard to be adsorbed in the activated carbon, such as methanol, formaldehyde.

While the foregoing description has been made in connection with the appratus of a single vertically elongated housing, it will be noted that the adsorption and desorption vessels are provided separately and in parallel. In such a case, a blower may be used for introducing the spent activated carbon from the adsorption vessel to the desorption vessel.

What is claimed is:

1. An apparatus for treating a gas containing organic substances with activated carbon while regenerating substantially spent activated carbon with a regeneration gas, comprising
(a) an adsorption vessel including
a top outlet port for treated gas,
a plurality of perforated plates supported in said adsorption vessel so as to divide the adsorption vessel into vertically spaced, contiguous, contacting chambers, said perforated plates each being adapted to permit a flow of gas therethrough and to support a mass of fluidized activated carbon thereon, each of said contacting chambers being provided with a passage through which a moving mass of activated carbon flows downward by gravity, the uppermost of said contacting chambers including a vertical partition plate dividing the inner space thereof into a first subcontacting chamber and a second subcontacting chamber, said first subcontacting chamber including a supply port adapted to receive regenerated activated carbon, said second subcontacting chamber including said outlet port for the treated gas and said passage for the uppermost perforated plate, said vertical partition plate including means adapted to allow activated carbon to flow therethrough from said first subcontacting chamber to said second subcontacting chamber, an inlet conduit adapted to introduce untreated gas into the adsorption vessel at a point below the lowermost perforated plate, and gas outlet conduit means connecting said inlet conduit for untreated gas with said first subcontacting chamber, (b) a desorption vessel adapted to receive a moved bed of substantially spent activated carbon from said adsorption vessel and having a port formed at the top of the desorption vessel and adapted so as to provide communication between the desorption vessel and the passage for moving activated carbon in the lowermost contacting chamber of the adsorption vessel, and to admit substantially spent activated carbon into the desorption vessel, a regeneration gas supply port at the lower portion of the desorption vessel, a regeneration gas discharge port at the upper portion of the desorption vessel, means for heating activated carbon in the desorption vessel, and a regenerated activated carbon discharge port at the bottom of the desorption vessel, (c) recycling conduit means extending between said regenerated activated carbon discharge port and said regenerated activated carbon supply port in the adsorption vessel, and (d) means for recycling the regenerated activated carbon from the desorption vessel to the adsorption vessel through said recycling conduit means.

2. The apparatus according to claim 1, wherein said means for heating activated carbon is a heat exchanger comprising a plurality of horizontally extending pipes supported in the desorption vessel and arranged in rows such that the lateral spacing between adjacent pipes is substantially equal, each of said pipes carrying a heating medium therewithin and having a plurality of fins around the outer peripheral surface thereof.

3. The apparatus according to claim 1, wherein said desorption vessel is forked at its lower end to form a plurality of chutes, the neck portion of each of said chutes leading to said regenerated activated carbon discharge port.

4. The apparatus according to claim 1, further comprising a packed layer of oxidizing catalyst at said outlet port for the treated gas.

5. The apparatus according to claim 1, further comprising a condenser connected to said regeneration gas discharge port for recovering the organic substances contained in the discharged regeneration gas.

6. The apparatus according to claim 2, further comprising a preheater disposed at a position above said regeneration gas discharge port.

7. An apparatus for treating a gas containing organic substances with activated carbon while regenerating substantially spent activated carbon with a regeneration gas, comprising a vertical elongated housing, a top outlet port for treated gas, a partition plate member within the housing dividing the inner space of the housing into an upper adsorption zone and a lower desorption zone, a plurality of perforated plates supported in said adsorption zone so as to divide the adsorption zone into vertically spaced, contiguous, contacting chambers, said perforated plates each being adapted to permit a flow of gas therethrough and to support a mass of fluidized activated carbon thereon, each of said contacting chambers being provided with a passage through which a moving mass of activated carbon flows downward by gravity, the uppermost of said contacting chambers including a vertical partition plate dividing the inner space thereof into a first subcontacting chamber and a second subcontacting chamber, said first subcontacting chamber including a supply port adapted to receive regenerated activated carbon, said second subcontacting chamber including said outlet port for the treated gas and said passage for the uppermost perforated plate, said vertical partition plate including means adapted to allow activated carbon to flow therethrough from said first subcontacting chamber to said second subcontacting chamber, an inlet conduit adapted to introduce untreated gas into the adsorption zone at a point below the lowermost perforated plates, gas outlet conduit means connecting said inlet conduit for untreated gas with said first subcontacting chamber, a port formed in said partition plate member and adapted so as to provide communication between the desorption zone and the passage for moving activated carbon in the lowermost contacting chamber of the adsorption zone and to admit substantially spent activated carbon therethrough into the desorption zone, a regeneration gas supply port at the lower portion of the desorption zone, a regeneration gas discharge port at the upper portion of the desorption zone, a heat exchanger disposed in the desorption zone above said regeneration gas supply port and arranged with a plurality of horizontally disposed pipes each carrying a heating medium therewithin and having a plurality of fins around the outer periphery thereof, and a preheater in the desorption zone at a position above said regeneration gas discharge port, an outlet member at the bottom of the desorption zone for the regenerated activated carbon, said outlet member including a plurality of chutes each of which is in an inverted frusto pyramidal shape and a regenerated activated carbon discharge port at the bottom of the housing, each of said chutes having an opening into said discharge port, recycling conduit means extending between said regenerated activated carbon discharge port and said regenerated activated carbon supply port in the adsorption zone, means for recycling the regenerated activated carbon from the desorption zone to the adsorption zone through said recycling conduit means.

* * * * *